Aug. 11, 1942.    C. A. CARRING    2,292,742
PLANT FOR COAGULATION AND SEDIMENTATION OF WATER
Filed Aug. 14, 1939    2 Sheets-Sheet 1

Inventor
C. A. Carring
By: Glascock Downing Heeb
Attys.

Aug. 11, 1942.  C. A. CARRING  2,292,742
PLANT FOR COAGULATION AND SEDIMENTATION OF WATER
Filed Aug. 14, 1939  2 Sheets-Sheet 2

Inventor,
C. A. Carring
By: Glascock Downing & Seebold
Attys.

Patented Aug. 11, 1942

2,292,742

UNITED STATES PATENT OFFICE 2,292,742

PLANT FOR COAGULATION AND SEDIMENTATION OF WATER

Carl Algot Carring, Stockholm, Sweden

Application August 14, 1939, Serial No. 290,143
In Sweden August 15, 1938

3 Claims. (Cl. 210—16)

The present invention relates to improvements in plants for coagulation and sedimentation of water.

The invention relates to plants of said kind which consist of a container divided into separate rooms above one another, the upper room being adapted for treatment of the raw water with air to form flakes of coagulated substances, and the lower room being adapted for sedimentation of said flakes and for discharge of water liberated from such flakes, the sedimentation room being divided into a plurality of sedimentation chambers provided with individual inlet conduits for water treated in the upper room of the container, and with individual means for flushing the sedimentation chambers free from deposits independently of each other.

According to the invention said flushing means consist of an air supply pipe communicating with a number of air nozzles arranged in corresponding openings in a wall of the sedimentation chamber, said nozzles cooperating with air distributing pipes provided with a plurality of perforations and extending transversely through the sedimentation chamber and the material therein, a plurality of openings for the discharge of the flushing medium and the flakes from the sedimentation chamber into a chamber provided with discharge pipes for the same.

A plant according to the invention is illustrated on the accompanying drawings.

Figure 1:
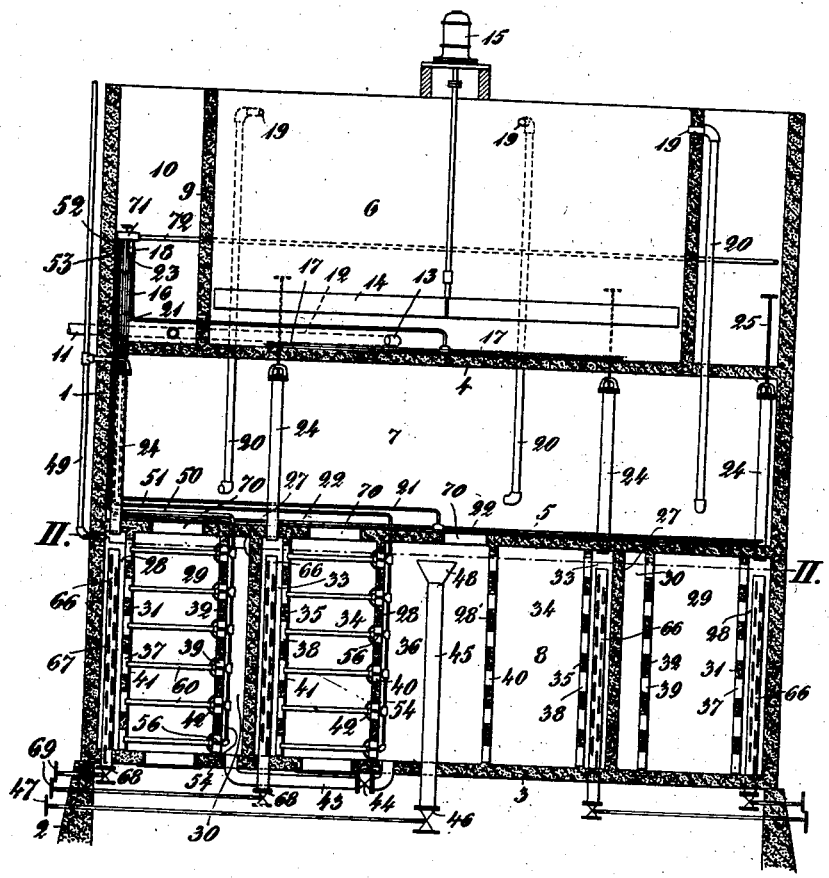
Fig. 1 is a vertical section through the plant taken along the line I—I in Fig. 2.
Figure 2:
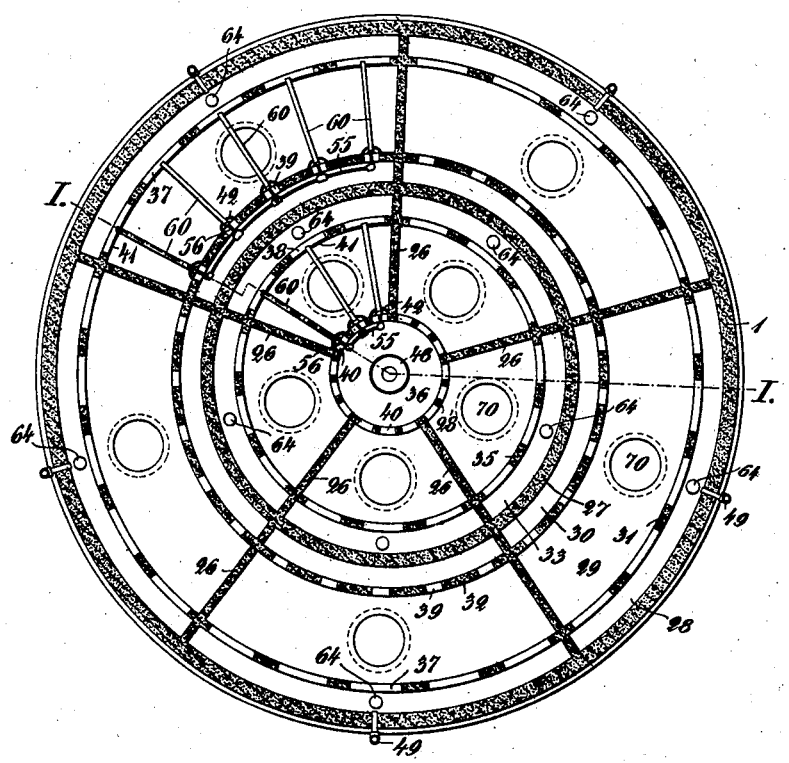
Fig. 2 is a horizontal section through the plant taken on the line II—II in Fig. 1.

The plant according to Figs. 1 and 2 consists of a cylindrical container 1 of concrete supported by a foundation 2. 3 is the bottom of the container 1. Between the bottom 3 and the top of the container two intermediary horizontal bottoms 4 and 5 are provided dividing the container into three rooms 6, 7 and 8. In the uppermost room a cylindrical partition wall 9 is arranged so that an annular room 10 is formed which is utilised as operating room for the plant.

The raw water is first led into the room 6 by the piping 11 from which a number of branch pipes 12 distribute the water to a number of intakes 13 near the bottom 4. 14 is a stirrer that is rotated by the electrical motor 15 mounted on top of the container. Air under pressure is supplied through the pipe 16 to a number of radial perforated distributing pipes arranged near the bottom 4.

The supplied air is controlled by the valve 18. The room 6 is provided with outlets 19 in the upper part of the wall 9, said outlets being connected to pipes 20, which open into the lower portion of the room 7 and convey the water from the room 6 together with the flakes formed in the room 6. Into the water in the room 7 air under pressure is conveyed through the pipe 21 to a number of radial perforated distributing pipes 22 arranged near the bottom 5. The supplied air is controlled by the valve 23. The water is conveyed from the room 7 to the room 8 by a number of pipes 24, each controlled by a valve stem 25 extending upwards into the operating room 10.

The above described rooms 6 and 7, in which the flakes are coagulated and the devices arranged therein are no part of the invention and have been described and illustrated only for the sake of completeness.

The invention is more particularly concerned with the lowermost room 8 in which the sedimentation of the flakes and the purification of the water takes place.

The room 8 is divided by a number of radial closed partition walls 26 (in the shown example five) extending to the outer wall 1 and by a vertical cylindrical closed wall 27 into a number of section chambers. These section chambers are partly outer chambers, partly interior chambers. The outer section chambers are each formed between the wall 27, the outer wall 1 and two partition walls 26.

The interior partition chambers are each formed inside the wall 27, between two of the partition walls 26 and a cylindrical wall 28'. The outer section chambers are each divided into three portions 28, 29 and 30 by two cylindrical vertical walls 31 and 32. The chambers 28 are the inlet chambers for water to be purified, 29 are sedimentation chambers for the water, and 30 are accumulating and outlet chambers for purified water.

The interior section chambers are each divided into two portions 33 and 34 by a cylindrical vertical wall 35 disposed between the wall 27 and the wall 28'. The chambers 33 are inlet chambers for water to be purified, and 34 are sedimentation chambers for the water. Inside of the wall 28' in the centre of the room 8 a main accumulating and outlet chamber 36 for the purified water is formed. The chamber 36 is common to all of the different section chambers.

The walls 31 and 35 are provided with a large number of inlet openings 37 and 38 respectively for the incoming water, and the walls 32 and 28' are provided with a corresponding number of outlet openings 39 and 40 respectively for the leaving purified water. The openings 39 and 40 are each situated right opposite to one of the openings 37 and 38 respectively. The inlet openings 37 and 38 are covered by perforated screens 41, and the outlet openings 39 and 40 are covered by perforated screens 42.

For each one of the annular inlet chambers 28 and 33 one of the pipes 24 is provided. The pipes 24 lead the water with the coagulated flakes into the chambers 28 and 33, from where the water flows into the sedimentation chambers 29 and 34 respectively through the openings 37 and 38 respectively.

In the sedimentation chambers 29 and 34 catalytically acting or flake-removing material (not shown) is accumulated, for example keramic goods, such as sharp-edged brick pieces, splinters or the like. In order to prevent such material from baking together it is suitable to arrange in the chambers 29 and 34 a number of perforated screens or plates (not shown) which support the material. From the sedimentation chambers 29 the purified water passes through the openings 39 respectively into the annular accumulating chambers 30. From the sedimentation chambers 34 the purified water passes through the openings 40 into the central accumulating chamber 36. The chambers 30 are each connected to the central chamber 36 by means of a pipe 43 provided with a shut-off valve 44. From the central chamber 36 the purified water is led off through a central discharge pipe 45 provided with an inlet 48 on a high level and valve 46 which is controlled from the outside by the hand-wheel 47. The upper portions of the chambers 28 are connected to the outer air by means of pipes 49. Similar pipes (not shown) connect the chambers 33 with the air.

By dividing the sedimentation room into a plurality of sedimentation chambers as described above, it is possible to flush and cleanse one of the chambers at a time independently of the other chambers.

According to the invention means have been provided to flush the sedimentation chambers independently of each other, when any of them has been choked with flakes to a greater extent, and such means will now be described.

Figure 3:
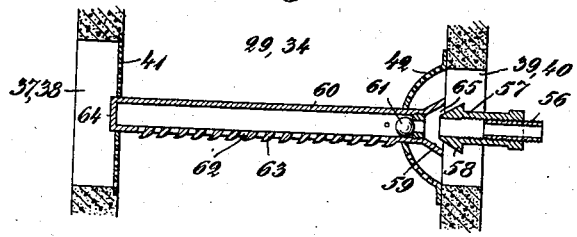
Fig. 3 is a longitudinal vertical section through a detail.

To each one of the sedimentation chambers 29 and 34 a pipe 50 or 51 respectively is arranged to supply compressed air for flushing purposes. The pipes 50 and 51 are controlled by a valve 52 and 53 respectively. The pipes 50 and 51 lead down into the accumulating chambers 30 and 36 respectively and are there branched off in vertical and horizontal pipes 54 and 55 respectively. In front of each outlet opening 39 and 40 a pipe 56 is branched off towards the centre of the opening. A nozzle 57 is screwed on to each pipe 56 (shown in detail in Fig. 3). The nozzle is provided with a conical head 58 adapted to co-operate with a conical seat 59 provided in the end of a distributing pipe 60 which is made integral with or secured centrally to the above mentioned perforated screen 42, which suitably is shaped as a spherical segment as shown in Fig. 3.

In the inlet end of the pipe 60 a ball valve 61 is arranged which prevents the water in the chambers 29, 34 from flowing out through the pipe 60. In the wall of the pipe 60 a number of holes 62 are made in such a manner that the material between adjacent holes form projecting guiding vanes or the like that give to the currents of air or liquid forced through the openings 62 an inclined direction in relation to the longitudinal axis of the pipe 60. The free end of the pipes 60 is closed at 64 and may be supported by the screen 41 in the opposite opening 37, 38 as shown in Fig. 3. The passage 65 between the nozzle head 58 and the seat 59 may be varied by screwing the nozzle on the pipe 56 or it may be entirely shut off. If the passage 65 is entirely shut off, only scavenging air will enter the pipe 60 from the pipe 56 when the valve 52 or 53 is opened. If the head 58 is removed from the seat more or less, the nozzle will act as an injector when the compressed air is led into the pipe 60 and bring also a current of clean water from the chamber 30 or 36 to flow into the pipe 60 and to mix with the air.

When any of the sedimentation chambers is to be flushed the valves in the pipes 24 are closed so that no water will enter from the room 7. In each section chamber 28 and 33 a vertical discharge pipe 66 is provided.

The pipes 66 extend upwards towards the bottom 5 and are provided with a large number of slits 67 through which the water may enter. In each of the pipes 66 a shut-off valve 68 is provided, which valves are controlled from the outside by hand-wheels 69. When a sedimentation chamber is to be flushed the corresponding valves 68 and 44 are closed and the corresponding air valve 52 or 53 is opened. Compressed air then flows through the pipe 50 and 51 to the pipes 54 and 55, the pipes 56 in that section, the nozzles 57 and the pipes 60 and is obliquely directed through the openings 62, 63 into the material in the sedimentation chamber. Flushing water flows of course into the chamber through the openings in the screens 42 and is together with the air discharged through the openings 37 and 38 but, as stated above, additional flushing water may be admitted by injector action if the nozzle heads 58 are removed more or less from the seats 59. The nozzles 57 in each sedimentation chamber may be adjusted in advance to suit the prevailing conditions to obtain an efficient flushing of the chamber. In some of the pipes 60 the passage 65 may be shut off so that only air enters such pipes, and in other pipes the passage 65 may be adjusted to various widths to adjust the quantity of flushing water injected into the corresponding pipes 60.

As an alternative chemical solutions may in case of need be used as flushing means instead of water. The flushing media entering the chambers 28 or 33 together with the deposits in the sedimentation chamber flow through the slits 67 into the pipe 66 and are discharged through the open valve 68.

Manholes 70 provided with covers are arranged in the bottom 5 to give access to the different chambers. The air valves 13, 23, 52, 53 in the operating room are assembled to units 71 connected to a common air supply pipe 72.

Having now particularly described the nature of my invention and the manner of its operation what I claim is:

1. A plant for coagulation and sedimentation of water comprising a container, at least one intermediate bottom in said container dividing the container into a corresponding number of separate rooms one above another, inlet for crude water leading to the uppermost of said rooms, pipes connecting each of the lower of said separate rooms with the adjacent upper room and adapted to lead water to the former from the latter, in the rooms above the lowermost room pipes for distributing air under pressure in the water to form flakes of coagulated substances therein, the lowermost room being adapted for sedimentation of said flakes, a plurality of vertical partition walls dividing said sedimentation room into a plurality of separate sedimentation chambers and an equal number of adjacent inlet chambers for water containing coagulated flakes and of adjacent outlet chambers for water liberated from the flakes, said inlet chamber communicating with the adjacent upper room by means of aforesaid water pipes and with the adjacent sedimentation chamber by means of a plurality of inlet openings in said vertical partition wall between said outlet chamber and said sedimentation chamber, and said outlet chambers communicating with the adjacent sedimentation chamber by means of a plurality of discharge openings in the respective partition wall, for each sedimentation chamber, an independent supply pipe for compressed air for flushing the sedimentation chamber free from deposits, a plurality of branch pipes leading for this purpose from said supply pipe through said outlet chamber to each one of said discharge openings in said partition wall between the sedimentation chamber and the outlet chamber, an air nozzle mounted on the end of each of said pipe branches in said discharge opening, air distributing pipes extending transversely through each sedimentation chamber from said air nozzles, a plurality of openings in the wall of said distributing pipes for blowing the flushing medium into the sedimentation chamber, a discharge conduit from said inlet chamber adapted to lead away the flakes and the flushing medium forced into said inlet chamber through said inlet openings when flushing the sedimentation chamber, and outlet conduits adapted to lead off purified water from said outlet chambers.

2. A plant according to claim 1, and wherein said air distributing pipes are each provided with an inlet opening, said inlet opening being arranged in one end of said air distributing pipe opposite to said air nozzle, said air nozzle being displaceably arranged to and from said inlet opening, a conical head on said air nozzle and a corresponding conical seat in said inlet opening.

3. A plant according to claim 1, and wherein said openings in the wall of the air distributing pipes in the sedimentation chambers are shaped as channels having an inclined direction in relation to the longitudinal direction of the distributing pipe.

CARL ALGOT CARRING.